(12) United States Patent
Komura et al.

(10) Patent No.: US 11,063,363 B2
(45) Date of Patent: Jul. 13, 2021

(54) ANTENNA ELEMENT, ANTENNA MODULE, AND COMMUNICATION DEVICE

(71) Applicant: Murata Manufacturing Co., Ltd., Kyoto (JP)

(72) Inventors: Ryo Komura, Kyoto (JP); Yoshiki Yamada, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 16/891,307

(22) Filed: Jun. 3, 2020

(65) Prior Publication Data
US 2020/0295464 A1 Sep. 17, 2020

Related U.S. Application Data

(63) Continuation of application No. PCT/JP2019/034889, filed on Sep. 5, 2019.

(30) Foreign Application Priority Data

Sep. 7, 2018 (JP) .............................. JP2018-167918

(51) Int. Cl.
*H01Q 9/04* (2006.01)
*H01Q 15/24* (2006.01)
(Continued)

(52) U.S. Cl.
CPC ........... *H01Q 9/0457* (2013.01); *H01Q 5/371* (2015.01); *H01Q 15/24* (2013.01); *H01Q 19/028* (2013.01); *H01Q 21/065* (2013.01); *H01Q 23/00* (2013.01)

(58) Field of Classification Search
CPC ...... H01Q 9/0457; H01Q 5/371; H01Q 15/24; H01Q 19/028; H01Q 21/065; H01Q 23/00;
(Continued)

(56) References Cited

U.S. PATENT DOCUMENTS

2004/0012527 A1 1/2004 Yuanzhu
2006/0262028 A1* 11/2006 Takei .................. H01Q 9/0442
343/850
(Continued)

FOREIGN PATENT DOCUMENTS

JP S62118608 A 5/1987
JP H11145722 A 5/1999
(Continued)

OTHER PUBLICATIONS

International Search Report for International Application No. PCT/JP2019/034889, dated Oct. 29, 2019.
(Continued)

*Primary Examiner* — Dimary S Lopez Cruz
*Assistant Examiner* — Michael M Bouizza
(74) *Attorney, Agent, or Firm* — Pearne & Gordon LLP

(57) ABSTRACT

A patch antenna includes: a ground conductor pattern lying in a plane and set to ground potential; a feeding conductor pattern lying in a plane and disposed in a manner so as to face the ground conductor pattern, the feeding conductor pattern having feed points that are opposite to each other with respect to a center point of the feeding conductor pattern; feed lines that are connected in parallel between the feed points and are of different lengths; and a frequency selection circuits disposed on a path of at least one of the feed lines, the frequency selection circuits being configured to allow passage of radio-frequency signals in one frequency band and to attenuate radio-frequency signals in another frequency band.

13 Claims, 10 Drawing Sheets

(51) Int. Cl.
*H01Q 19/02* (2006.01)
*H01Q 21/06* (2006.01)
*H01Q 23/00* (2006.01)
*H01Q 5/371* (2015.01)

(58) Field of Classification Search
CPC ........ H01Q 9/0414; H01Q 5/321; H01Q 5/35; H04B 7/08; H04B 7/06
See application file for complete search history.

(56) References Cited

U.S. PATENT DOCUMENTS

| | | |
|---|---|---|
| 2013/0072136 A1 | 3/2013 | Besoli et al. |
| 2016/0043468 A1* | 2/2016 | Onaka ................ H01Q 5/371 343/750 |
| 2016/0261039 A1* | 9/2016 | Parsche ............... H01Q 9/0457 |
| 2019/0229421 A1 | 7/2019 | Onaka et al. |

FOREIGN PATENT DOCUMENTS

| | | |
|---|---|---|
| JP | 2001136019 A | 5/2001 |
| JP | 2004056204 A | 2/2004 |
| JP | 2004215245 A | 7/2004 |
| JP | 2006261800 A | 9/2006 |
| JP | 2007082110 A | 3/2007 |
| JP | 2007158555 A | 6/2007 |
| JP | 2000236211 A | 8/2008 |
| WO | 2018074378 A1 | 4/2018 |

OTHER PUBLICATIONS

Written Opinion for International Application No. PCT/JP2019/034889, dated Oct. 29, 2019.

* cited by examiner

FIG. 5
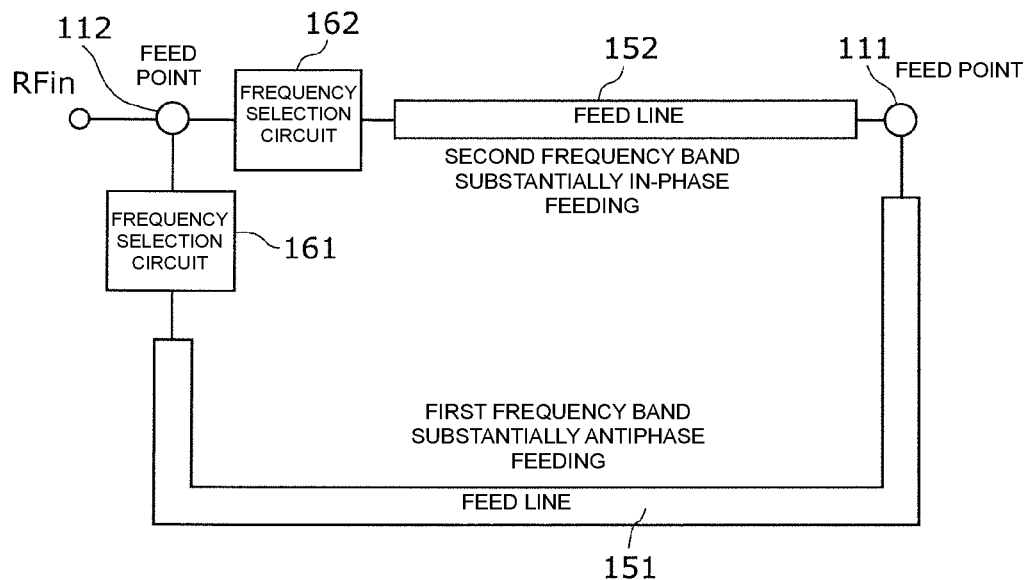
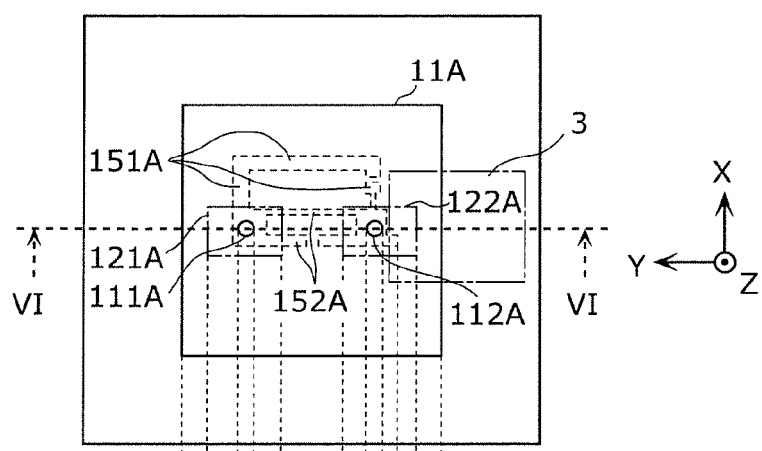
FIG. 6A
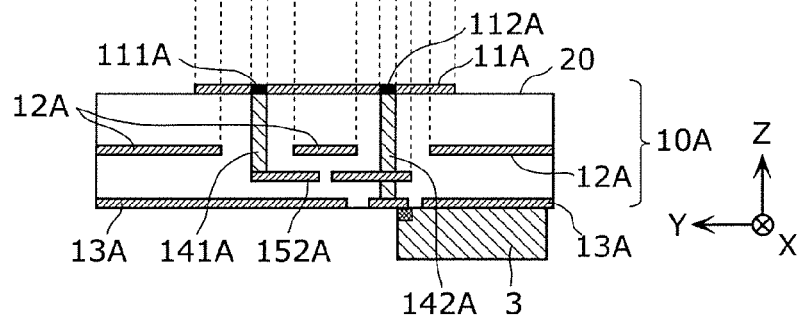
FIG. 6B

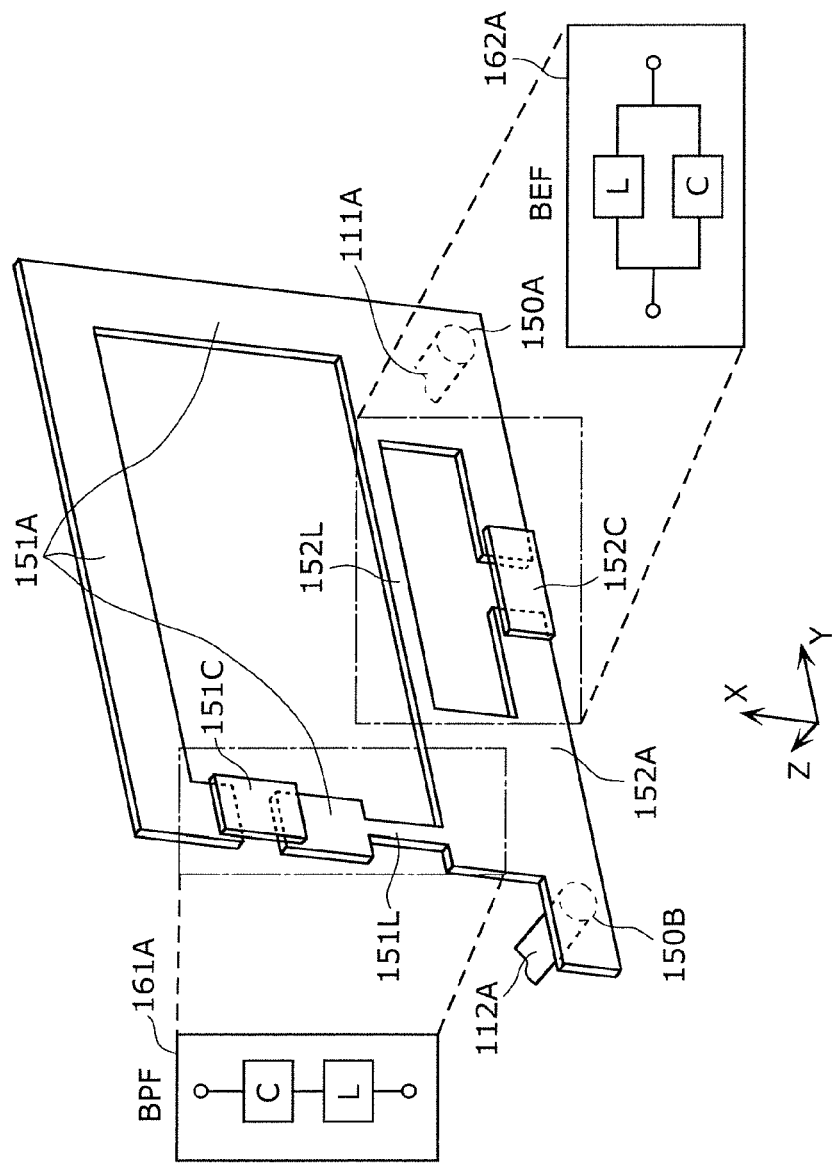

25.0GHz 28.0GHz
(26.5–29.5 GHz)

31.0GHz

EMBODIMENT 25.0GHz 28.0GHz
(26.5–29.5 GHz)

31.0GHz

⇧ PHASE DIFFERENCE 0°

⬛ PHASE DIFFERENCE 180°

ANTENNA ELEMENT, ANTENNA MODULE, AND COMMUNICATION DEVICE

This is a continuation of International Application No. PCT/JP2019/034889 filed on Sep. 5, 2019 which claims priority from Japanese Patent Application No. 2018-167918 filed on Sep. 7, 2018. The contents of these applications are incorporated herein by reference in their entireties.

BACKGROUND

Technical Field

The present disclosure relates to an antenna element, an antenna module, and a communication device.

A wireless device (antenna module) disclosed in Patent Document 1 is an example of antennas for radio communications. The wireless device disclosed in Patent Document 1 includes array antennas, each of which includes patch antennas in two-dimensional arrangement. In the patch antennas, a radio-frequency substrate is sandwiched between a conductor pattern and a ground conductor. Each array antenna includes a filter disposed between patch antennas of the array antenna to block signals in frequency bands other than a certain frequency band. This configuration conceivably enables the wireless device to achieve compactness and to offer added performance.

Patent Document 1: Japanese Unexamined Patent Application Publication No. 2007-158555

BRIEF SUMMARY

The filters disposed on corresponding lines through which radio-frequency signals are transmitted to the patch antennas of the array antenna (antenna element) described in Patent Document 1 have the function of blocking signals in frequency bands other than a certain frequency bands. Due to adoption of advanced multi-band features, such an antenna element may need to meet stringent demands on enhanced frequency selectivity and high directivity in a plurality of frequency bands. The bandpass characteristics such as filter steepness and insertion loss may thus need to be improved to address the demands. The filters with the improved bandpass characteristics are more sophisticated in functionality and may thus be large. As a result, the antenna element may also be large.

The present disclosure provides an antenna element, an antenna module, and a communication device that are compact and have enhanced frequency selectivity and high directivity.

An antenna element according to an aspect of the present disclosure includes: a ground conductor lying in a plane and set to ground potential; a feeding conductor lying in a plane and disposed in a manner so as to face the ground conductor, the feeding conductor having a first feed point and a second feed point that are opposite to each other with respect to a center point of the feeding conductor when the feeding conductor is viewed in plan, the feeding conductor being configured to be fed with radio-frequency signals through the first and second feed points; a first feed line and a second feed line that are connected in parallel between the first and second feed points and are of different lengths; and a frequency selection circuit disposed on a path of at least one of the first and second feed lines, the frequency selection circuit being configured to allow passage of radio-frequency signals in one frequency band and to attenuate radio-frequency signals in another frequency band.

The present disclosure provides an antenna element, an antenna module, and a communication device that are compact and have enhanced frequency selectivity and high directivity.

BRIEF DESCRIPTION OF THE SEVERAL VIEWS OF THE DRAWINGS

FIG. 5 is a schematic circuit diagram of the patch antenna according to the embodiment, illustrating a feeding configuration of the patch antenna.

FIGS. 6A and 6B include a plan view and a sectional view, respectively, of an antenna module according to a modification of the embodiment.

FIG. 7B is a perspective view of principal part of the patch antenna according to the modification of the embodiment, illustrating an example feeding configuration of the patch antenna.

DETAILED DESCRIPTION

Figure 1:
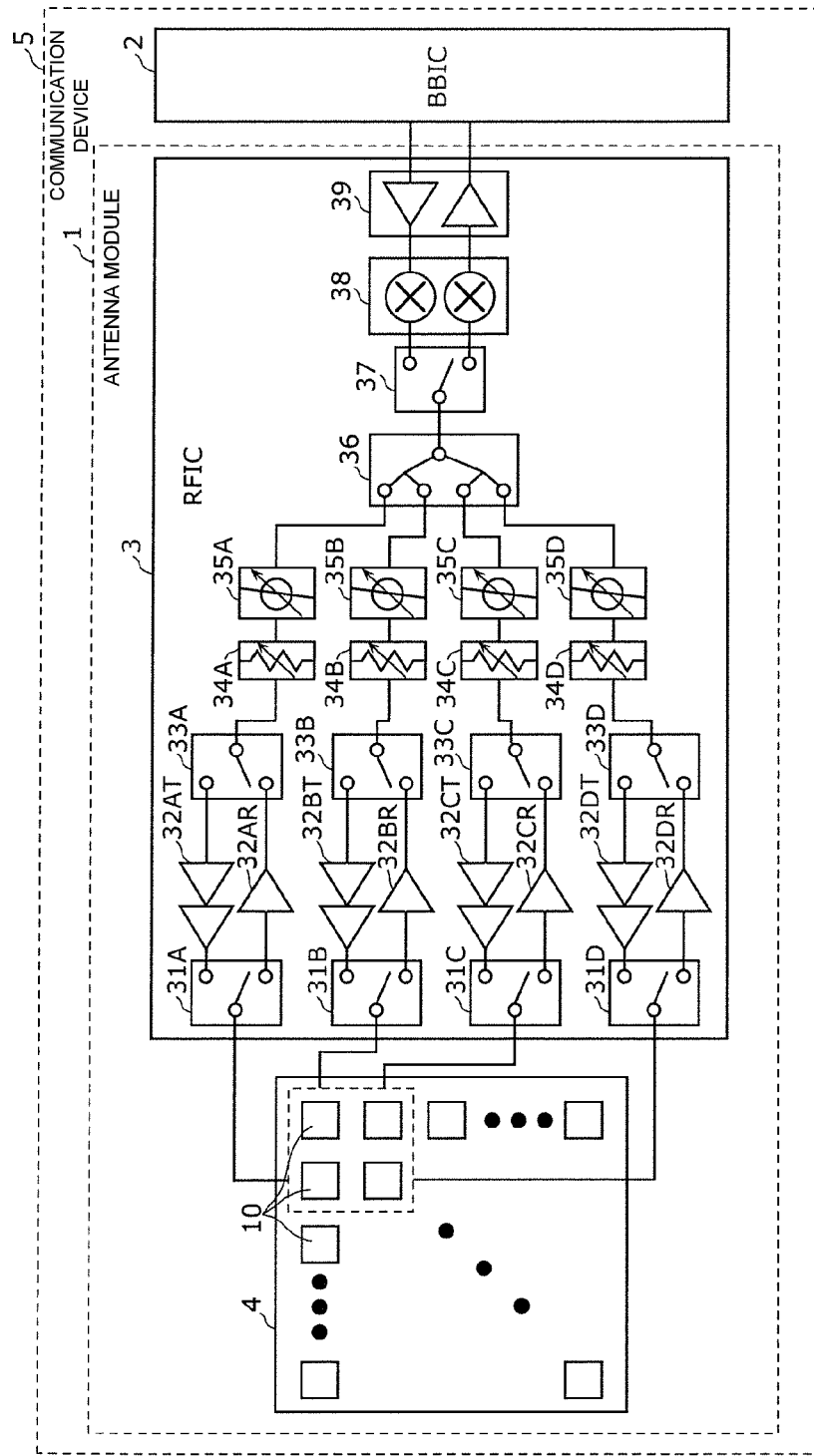
FIG. 1 is a circuit diagram illustrating a communication device (an antenna module) according to an embodiment and peripheral circuitry.

Hereinafter, embodiments of the present disclosure will be described in detail with reference to the drawings. The following embodiments are general or specific examples. Details such as values, shapes, materials, constituent components, and arrangements and connection patterns of the constituent components in the following embodiments are provided merely as examples and should not be construed as limiting the present disclosure. Of the constituent components in the following embodiments, constituent components that are not mentioned in independent claims are described as optional constituent components. The sizes and the relative proportions of the constituent components illustrated in the drawings are not necessarily to scale.

Embodiment

[1.1 Circuit Configuration of Communication Device (Antenna Module)]

FIG. 1 is a circuit diagram of a communication device 5 according to an embodiment. The communication device 5 illustrated in the drawing includes an antenna module 1 and a baseband signal processing circuit (BBIC) 2. The antenna module 1 includes an array antenna 4 and a radio-frequency (RF) signal processing circuit (RFIC) 3. The communication device 5 up-converts signals transmitted from the baseband signal processing circuit (BBIC) 2 to the antenna module 1 and radiates resultant radio-frequency signals from the array antenna 4. The communication device 5 down-converts radio-frequency signals received through the array antenna 4, and resultant signals are processed in the baseband signal processing circuit (BBIC) 2.

The array antenna 4 includes a plurality of patch antennas 10 in two-dimensional arrangement. Each patch antenna 10 is an antenna element that functions as a radiating element configured to radiate radio waves (radio-frequency signals) and as a receiving element configured to receive radio waves (radio-frequency signals). In the present embodiment, the array antenna 4 may be configured as a phased-array antenna.

Each patch antenna 10 has a compact structure that enables a radiating element (feeding conductors) to radiate linearly polarized waves with good directivity in a certain frequency band (a certain communication band). More specifically, the patch antenna 10 includes: a ground conductor lying in a plane and set to ground potential; a feeding conductor lying in a plane and disposed in a manner so as to face the ground conductor, the feeding conductor having a first feed point and a second feed point that are opposite to each other with respect to a center point of the feeding conductor when the feeding conductor is viewed in plan, the feeding conductor being configured to be fed with radio-frequency signals through the first and second feed points; a first feed line and a second feed line that are connected in parallel between the first and second feed points and are of different lengths; and a frequency selection circuit disposed on a path of at least one of the first and second feed lines, the frequency selection circuit being configured to allow passage of radio-frequency signals in one frequency band and to attenuate radio-frequency signals in another frequency band.

The patch antenna 10 configured as described above uses feed lines of different lengths to achieve enhanced frequency selectivity. Requirements pertaining to bandpass characteristics of radio-frequency signals and required of the frequency selection circuit may thus be less stringent than requirements pertaining to bandpass characteristics of radio-frequency signals and required of filter circuitry included in a conventional antenna module in which the frequency selectivity for radiation of radio waves may be enhanced through the use of the filter circuitry alone. The frequency selection circuit may thus be compact, and hence the antenna device may be compact and have enhanced frequency selectivity and high directivity.

The array antenna 4 includes a plurality of patch antennas 10 in one-dimensional or two-dimensional arrangement. A dielectric substrate and a ground conductor pattern are shared by the patch antennas 10.

The patch antennas 10 may be made of sheet metal instead of including the dielectric substrate. The patch antennas 10 constituting the array antenna 4 are provided on and in the same dielectric substrate. Furthermore, the patch antennas may be provided on or in the same substrate. Alternatively, one or more of the patch antennas 10 constituting the array antenna 4 may be provided on another member such as a housing instead of being provided on or in the dielectric substrate.

The patch antennas 10 have good directivity and enhanced frequency selectivity as described above, and the array antenna 4 has good directivity and enhanced frequency selectivity accordingly. Furthermore, each patch antenna 10 involves antiphase feeding to two feed points arranged symmetrically about the center point and thus has enhanced symmetry of directivity and a high level of cross-polarization discrimination (XPD). The patch antennas 10, which have high directivity, may constitute a phased array antenna that offers enhanced symmetry of gain during tilt of the array antenna 4. For example, such a phased array antenna having a coverage angle of ±45° may eliminate the possibility of excessively high gain in a direction at an angle of +45° and low gain in directions at angles of −45° and 0°.

The RF signal processing circuit (RFIC) 3 includes switches 31A to 31D, 33A to 33D, and 37, power amplifiers 32AT to 32DT, low-noise amplifiers 32AR to 32DR, attenuators 34A to 34D, phase shifters 35A to 35D, a signal combiner/splitter 36, a mixer 38, and an amplifier circuit 39.

The switches 31A to 31D and 33A to 33D are switching circuits that switch between transmission and reception on corresponding signal paths.

Each of the phase shifters 35A to 35D is a phase-shift circuit that shifts the phase of a radio-frequency signal.

Signals transmitted from the baseband signal processing circuit (BBIC) 2 are amplified in the amplifier circuit 39 and are then up-converted in the mixer 38. Each of the up-converted radio-frequency signals is split into four waves by the signal combiner/splitter 36. The four waves flow through the four respective transmission paths and are fed to different patch antennas 10. The phase shifters 35A to 35D disposed on the respective signal paths may provide individually adjusted degrees of phase shift, and the directivity of the array antenna 4 may be adjusted accordingly.

Radio-frequency signals received by the patch antennas 10 included in the array antenna 4 flow through four different reception paths and are combined by the signal combiner/splitter 36. The combined signals are down-converted in the mixer 38, are amplified in the amplifier circuit 39, and are then transmitted to the baseband signal processing circuit (BBIC) 2.

The RF signal processing circuit (RFIC) 3 is provided as, for example, one-chip integrated circuit component having the circuit configuration described above.

The aforementioned components such as the switches 31A to 31D, 33A to 33D, and 37, the power amplifiers 32AT to 32DT, the low-noise amplifiers 32AR to 32DR, the attenuators 34A to 34D, the phase shifters 35A to 35D, the signal combiner/splitter 36, the mixer 38, and the amplifier circuit 39 may be optionally included in the RF signal processing circuit (RFIC) 3. The transmission paths or the reception paths may be omitted from the RF signal processing circuit (RFIC) 3. The communication device 5 according to the present embodiment is applicable to a system provided not only for transmission and reception of radio-frequency signals in one frequency band (single-band transmission and reception of radio-frequency signals) but also for transmission and reception of radio-frequency signals in a plurality of frequency bands (multi-band transmission and reception of radio-frequency signals).

[1.2 Configuration of Patch Antenna]

Figure 2:
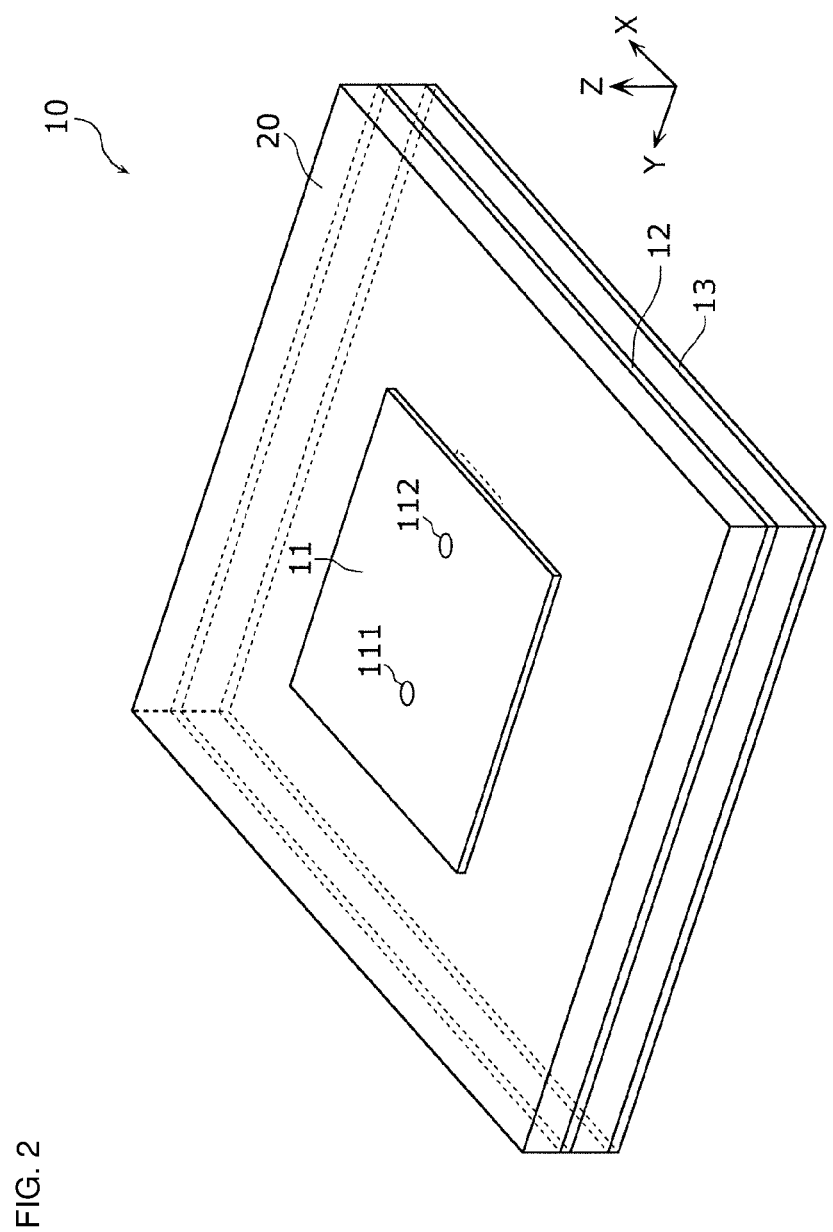
FIG. 2 is a perspective view of a patch antenna according to an embodiment, illustrating principal part thereof.
Figure 3A:
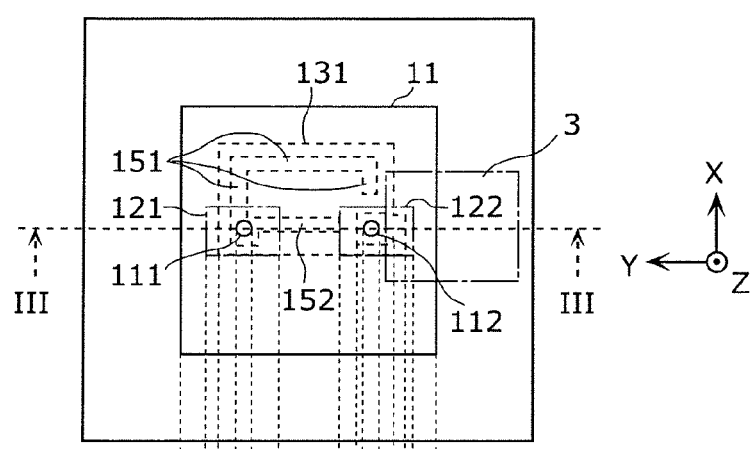
FIGS. 3A and 3B include a plan view and a sectional view, respectively, of the antenna module according to the embodiment.
Figure 3B:
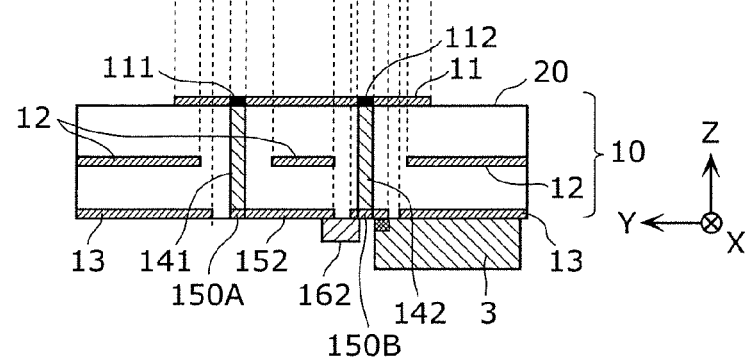
Figure 4A:
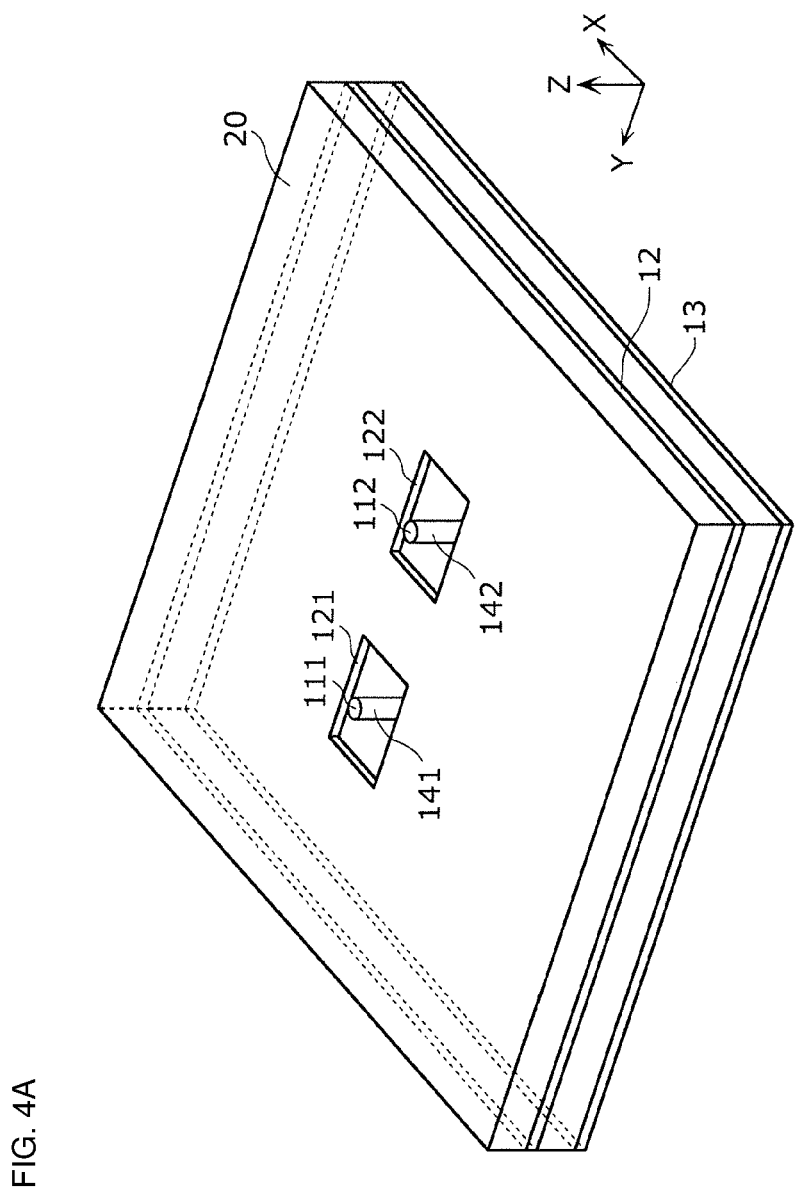
FIG. 4A is a perspective view of the patch antenna according to the embodiment, illustrating principal part thereof except for a feeding conductor pattern.
Figure 4B:
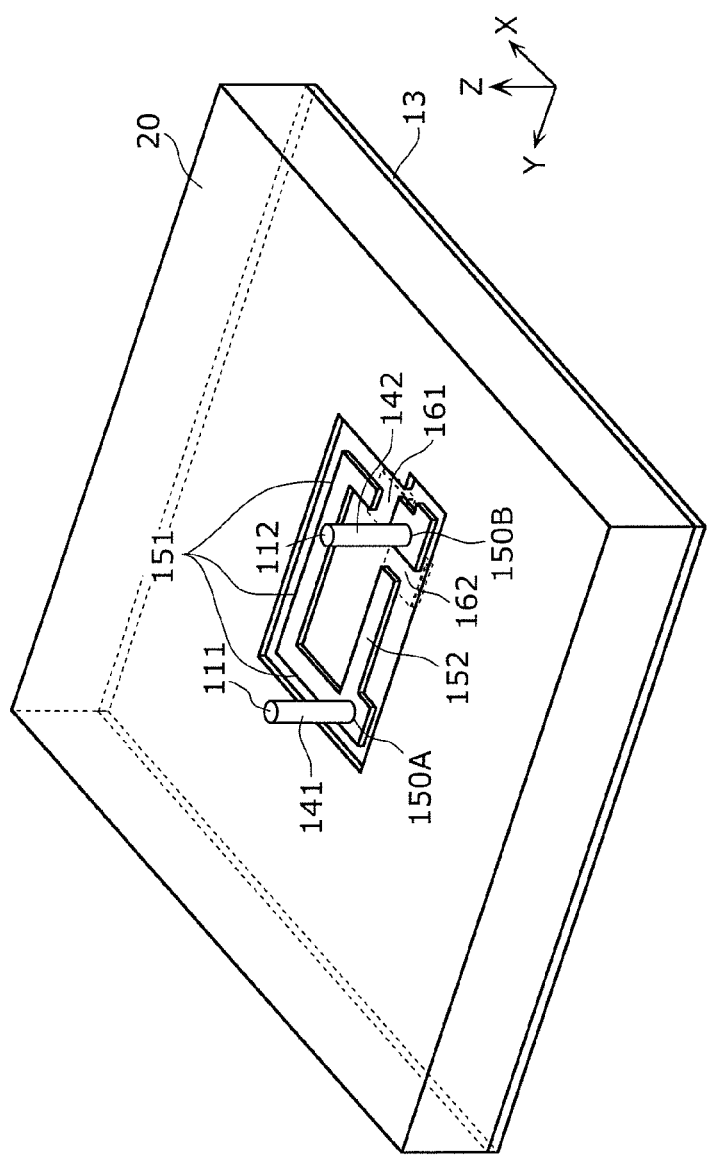
FIG. 4B is a perspective view of the patch antenna according to the embodiment, illustrating principal part thereof except for the feeding conductor pattern and a second ground conductor pattern.

FIG. 2 is a perspective view of the patch antenna 10 according to an embodiment, illustrating principal part thereof. FIGS. 3A and 3B include a plan view and a sectional view, respectively, of the antenna module 1 according to the embodiment. FIG. 4A is a perspective view of the patch antenna 10 according to the embodiment, illustrating principal part thereof except for a feeding conductor pattern 11 and a dielectric substrate 20. FIG. 4B is a perspective view of the patch antenna 10 according to the embodiment, illustrating principal part thereof except for the feeding conductor pattern 11, a ground conductor pattern 12, and the dielectric substrate 20. FIG. 3B is a sectional view of the antenna module 1 taken along line III-III in FIG. 3A.

As illustrated in FIG. 2, the patch antenna 10 includes the dielectric substrate 20, the ground conductor pattern 12, a ground conductor pattern 13, and the feeding conductor pattern 11. As illustrated in FIGS. 3A, 3B, and 4B, the patch antenna 10 also includes feed lines 151 and 152 and frequency selection circuits 161 and 162.

As illustrated in FIG. 3B, the antenna module 1 includes the patch antenna 10 and the RFIC 3. The RFIC 3 is a feeder circuit that feeds radio-frequency signals to the feeding conductor pattern 11. The RFIC 3 may be disposed on a main surface of the dielectric substrate 20 opposite to another main surface on which the feeding conductor pattern 11 is provided.

The ground conductor pattern 13 is a first ground conductor lying in a plane and provided on a main surface on the back side (in the z-axis negative direction) of the dielectric substrate 20 in a manner so as to be substantially parallel to another main surface of the dielectric substrate 20 as illustrated in FIG. 2. The ground conductor pattern 13 is set to ground potential.

The feeding conductor pattern 11 is a feeding conductor lying in a plane and is disposed on the dielectric substrate 20 in a manner so as to face (be substantially parallel to) the ground conductor pattern 13 as illustrated in FIG. 2. The feeding conductor pattern 11 has a feed point 111 (a first feed point) and a feed point 112 (a second feed point), which are opposite to each other with respect to the center point of the feeding conductor pattern 11 when the feeding conductor pattern 11 is viewed in plan (in the direction from the Z-axis positive side to the Z-axis negative side). As illustrated in FIGS. 4A and 4B, the feed points 111 and 112 are points on the feeding conductor pattern 11 that are connected directly to feeding via conductors 141 and 142, respectively. It is only required that the feed points 111 and 112 be opposite to each other with respect to the center point. To ensure radiation of radio waves with enhanced directivity, the feed points 111 and 112 cam be arranged symmetrically about the center point in the Y-axis direction as illustrated in FIG. 3A. The feed points 111 and 112 may be fed capacitively through the feeding via conductors 141 and 142, respectively. In this case, the feed points 111 and 112 may be respectively connected to the feeding via conductors 141 and 142 through corresponding capacitive coupling portions instead of being respectively connected directly to the feeding via conductors 141 and 142.

In practical terms, the feed point is herein defined as a feed region of modest size.

The center point of the feeding conductor (pattern) is herein defined as, for example, the intersection of two diagonals of the feeding conductor (pattern) when the feeding conductor (pattern) has a rectangular shape.

In the present embodiment, the feeding conductor pattern 11 has a rectangular shape when viewed in plan. The feed points 111 and 112 of the feeding conductor pattern 11 are off-center in the Y-axis direction. Thus, the main polarization direction of the patch antenna 10 coincides with the Y-axis direction, and the main polarization plane of the patch antenna 10 coincides with the Y-Z plane.

The ground conductor pattern 12 is a second ground conductor lying in a plane and provided between the ground conductor pattern 13 and the feeding conductor pattern 11 in a manner so as to be substantially parallel to the main surfaces of the dielectric substrate 20 as illustrated in FIG. 2. The ground conductor pattern 12 is set to ground potential. As illustrated in FIG. 4A, the ground conductor pattern 12 has cavities 121 and 122. The feeding via conductors 141 and 142 extend through the cavities 121 and 122, respectively.

The ground conductor pattern 12 may be optionally included in the patch antenna 10 according to the present embodiment. The ground conductor pattern 12 may eliminate or reduce the possibility of the occurrence of interference between current flowing through the feeding conductor pattern 11 and current flowing through the feed lines 151 and 152 and through the feeding via conductors 141 and 142.

The dielectric substrate 20 has a multilayer structure in which the ground conductor pattern 13 and the feeding conductor pattern 11 are disposed with a dielectric material therebetween. The dielectric substrate 20 may be, for example, a low-temperature co-fired ceramic (LTCC) substrate or a printed circuit board. Alternatively, the dielectric substrate 20 may be merely a space in which no dielectric material is disposed. In this case, a structure that supports the feeding conductor pattern 11 is required.

As illustrated in FIGS. 3A. 3B, and 4B, the feed line 151 is a first feed line disposed between feed branch points 150A and 150B. The feed branch points 150A and 150B are branch points of a common feed line. The feed line 152 is a second feed line disposed between the feed branch points 150A and 150B. The feed lines 151 and 152 are lines branching from the branch points (the feed branch points 150A and 150B) of the common feed line. The common feed line (not illustrated) is, for example, a line connecting the RFIC 3 to the feed branch point 150B.

As illustrated in FIG. 4B, the frequency selection circuit 161 is disposed on the feed line 151 (a first path connecting the feed branch point 150A to the feed branch point 150B). In the present embodiment, the feed line 151 and the frequency selection circuit 161 are connected in series between the feed branch points 150A and 150B. The frequency selection circuit 161 (illustrated in FIG. 4B and not illustrated in FIG. 3B) may be disposed on a main surface of the dielectric substrate 20 opposite to another main surface on which the feeding conductor pattern 11 is provided.

As illustrated in FIG. 4B, the frequency selection circuit 162 is disposed on the feed line 152 (a second path connecting the feed branch point 150A to the feed branch point 150B). In the present embodiment, the feed line 152 and the frequency selection circuit 162 are connected in series between the feed branch points 150A and 150B. The frequency selection circuit 162 (illustrated in FIG. 3B and in FIG. 4B) may be disposed on a main surface of the dielectric substrate 20 opposite to another main surface on which the feeding conductor pattern 11 is provided.

The feed branch point 150A is connected to the feed point 111 through the feeding via conductor 141, and the feed branch point 150B is connected to the feed point 112 through the feeding via conductor 142.

Each of the frequency selection circuits 161 and 162 is a circuit configured to allow passage of radio-frequency signals in one frequency band and to attenuate radio-frequency signals in another frequency band.

FIG. 5 is a schematic circuit diagram of the patch antenna 10 according to the embodiment, illustrating a feeding configuration of the patch antenna 10. FIG. 5 illustrates a schematic circuit configuration extending from the RFIC 3 (RFin in FIG. 5) to the feed points 111 and 112. As illustrated in FIG. 5, the feed lines 151 and 152 are of different lengths. This configuration offers the following advantages: radio-frequency signals lying in a first frequency band and being substantially in antiphase to each other may be respectively transmitted to the feed points 111 and 112 through the feed line 151, on which the frequency selection circuit 161 is disposed; and radio-frequency signals lying in a second frequency band different from the first frequency band and being substantially in phase with each other may be respectively transmitted to the feed points 111 and 112 through the feed line 152, on which the frequency selection circuit 162 is disposed.

More specifically, the electrical length of the first path connecting the feed branch point 150A, the feed line 151, the frequency selection circuit 161, and the feed branch point 150B is different from the electrical length of the second path connecting the feed branch point 150A, the feed line 152, the frequency selection circuit 162, and the feed branch point 150B. Specifically, L1 denoting the electrical length of the first path is written as $L1 \approx (n+1/2)\lambda 1\,g$, where n is any integer and $\lambda 1\,g$ is the wavelength (in the dielectric substrate 20) at the center frequency of the first frequency band. L2 denoting the electrical length of the second path is written as $L2 \approx n\lambda 2\,g$, where n is any integer and $\lambda 2\,g$ is the wavelength (in the dielectric substrate 20) at the center frequency of the second frequency band.

Thus, radio-frequency signals lying in the first frequency band and being substantially in antiphase to each other are respectively fed through the feed line 151 to the feed points 111 and 112, which are opposite to each other with respect to the center point of the feeding conductor pattern 11. In the flow of current from the feed points 111 and 112 through the feeding conductor pattern 11, the vectors of radio-frequency currents lying in the first frequency band and respectively flowing from the feed point 111 and 112 are aligned in a direction of connection between the feed points 111 and 112 (in the Y-axis direction), and symmetry of directivity may be enhanced accordingly. More specifically, the directivity obtained tends to be in a zenith direction (the Z-axis positive direction). Meanwhile, radio-frequency signals lying in the second frequency band and being substantially in phase with each other are respectively fed through the feed line 152 to the feed points 111 and 112. In the flow of current from the feed points 111 and 112 through the feeding conductor pattern 11, components of radio-frequency current lying in the second frequency band and flowing in the direction of connection between the feed points 111 and 112 (in the Y-axis direction) cancel each other, and the antenna efficiency may degrade accordingly. The flow of current through the feeding conductor pattern 11 may be regulated accordingly. Thus, the directivity and the frequency selectivity for first-frequency-band radio waves radiated from the feeding conductor pattern 11 may be enhanced. Furthermore, symmetry of the directivity of the first-frequency-band radio waves may be enhanced, and the cross-polarization discrimination (XPD) of the first-frequency-band radio waves may be improved.

The aforementioned configuration offers the following advantages. Radio-frequency signals lying in the first frequency band and being substantially in antiphase to each other may be respectively fed to the feed points 111 and 112 through the feed line 151 by the frequency selection circuit 161. Radio-frequency signals lying in the second frequency band and being substantially in phase with each other may be respectively fed to the feed points 111 and 112 through the feed line 152 by the frequency selection circuit 162. Consequently, the directivity of first-frequency-band radio waves may be enhanced, and radiation of second-frequency-band radio waves may be suppressed. This may lead to enhanced frequency selectivity and high directivity. The patch antenna 10 employs antiphase feeding through the feed line 151 and in-phase feeding through the feed line 152 to achieve enhanced frequency selectivity. Requirements pertaining to bandpass characteristics of radio-frequency signals and required of the frequency selection circuits 161 and 162 may thus be less stringent than requirements pertaining to bandpass characteristics of radio-frequency signals and required of filter circuitry included in a conventional antenna module in which the frequency selectivity for radiation of radio waves may be enhanced through the use of the filter circuitry alone. Specifically, requirements pertaining to bandpass characteristics such as steepness and insertion loss and required of the frequency selection circuits 161 and 162 may be less stringent than requirements pertaining to the bandpass characteristics and required of the filter circuitry of the conventional antenna module. The frequency selection circuits 161 and 162 may thus be compact, and hence the patch antenna 10 may be compact and have enhanced frequency selectivity and high directivity.

When the feeding conductor pattern 11 is viewed in plan, the feed lines 151 and 152 and the frequency selection circuits 161 and 162 of the patch antenna 10 according to the present embodiment are disposed within a region over which the feeding conductor pattern 11 extends as illustrated in FIG. 3A.

That is, when the feeding conductor pattern 11 is viewed in plan, neither the feed lines 151 and 152 nor the frequency selection circuits 161 and 162 are disposed outside the region over which the feeding conductor pattern 11 extends. The patch antenna 10 and the antenna module 1 may thus be compact.

As illustrated in FIG. 4B, the feed lines 151 and 152 and the feed branch points 150A and 150B in the present embodiment are provided in a layer in which the ground conductor pattern 13 lies. More specifically, the feed lines 151 and 152 are provided in a cavity 131 (illustrated in FIG. 3A) of the ground conductor pattern 13. Each of the frequency selection circuits 161 and 162 is, for example, an LC circuit including an inductor and a capacitor and is constructed of chip components. The chip components are mounted on one of main surfaces of the dielectric substrate 20. The main surface is closer to the ground conductor pattern 13 than the other main surface of the dielectric substrate 20. This configuration eliminates the addition of an electrode layer other than the ground conductor pattern 13 for the feed lines 151 and 152 and for the frequency selection circuits 161 and 162. The process for producing the patch antenna 10 may thus be simplified.

Each of the frequency selection circuits 161 and 162 is configured as the LC circuit and may thus function as a band pass filter, a band elimination filter, a low-pass filter, or a high-pass filter in a relatively flexible manner when allowing passage of radio-frequency signals in a certain frequency band or attenuating radio-frequency signals in a certain frequency band.

It is not required that inductors and capacitors constituting the frequency selection circuits 161 and 162 be chip components. Each inductor and each capacitor may be provided as part of the feed line 151 or 152. As for the inductor, the line width of a portion of the feed line 151 or 152 may be smaller than the line width of the other portion of the feed line 151 or 152. In this way, a desired inductance component may be provided. As for a capacitor, the feed line 151 or 152 may include a discontinuity, where a desired capacitance component may be provided. That is, at least one of the frequency selection circuits 161 and 162 may be provided as part of the feed line 151 or 152.

The frequency selection circuits 161 and 162 may thus take up no extra space except for the space required for the feed lines 151 and 152. The patch antenna 10 may be more compact accordingly.

The frequency selection circuit 161 is, for example, a band-pass filter circuit whose pass band is the first frequency band. The frequency selection circuit 162 is, for example, a band-elimination filter circuit whose attenuation band is the first frequency band. Radio-frequency signals in the first frequency band that are transmitted through the feed line 151 and the frequency selection circuit 161 (the band-pass filter circuit) and are substantially in antiphase to each other are respectively fed to the feed points 111 and 112. Radio-frequency signals in the second frequency band that are transmitted through the feed line 152 and the frequency selection circuit 162 (the band-elimination filter circuit) and are substantially in phase with each other are respectively fed to the feed points 111 and 112.

Radio-frequency signals lying in the first frequency band and directed to the feeding conductor pattern 11 are kept, to the extent possible, from flowing into the feed line 152 by the frequency selection circuit 162. The frequency selection circuit 161 causes these signals to flow through the feed line 151. Radio-frequency signals in the second frequency band are kept, to the extent possible, from flowing into the feed line 151 by the frequency selection circuit 161. The frequency selection circuit 162 causes these signals to flow through the feed line 152. Consequently, radio-frequency signals lying in the first frequency band and being in antiphase to each other are respectively fed to the feed points 111 and 112, and radio-frequency signals lying in the second frequency band and being in phase with each other are respectively fed to the feed points 111 and 112. This may lead to further enhanced frequency selectivity and higher directivity in the first frequency band.

The frequency selection circuit 162 may be, for example, a band-pass filter circuit whose pass band is the second frequency band. Radio-frequency signals in the first frequency band that are transmitted through the feed line 151 and the frequency selection circuit 161 (the band-pass filter circuit) and are substantially in antiphase to each other are respectively fed to the feed points 111 and 112. Radio-frequency signals in the second frequency band that are transmitted through the feed line 152 and the frequency selection circuit 162 (the band-pass filter circuit) and are substantially in phase with each other are respectively fed to the feed points 111 and 112.

Consequently, antiphase components of radio-frequency signals lying in the first frequency band and directed to the feeding conductor pattern 11 are respectively fed to the feed points 111 and 112 by the frequency selection circuit 161, and in-phase components of radio-frequency signals lying in the second frequency band and directed to the feeding conductor pattern 11 are respectively fed to the feed points 111 and 112 by the frequency selection circuit 162. This may lead to further enhanced frequency selectivity and higher directivity in the first frequency band.

When the first frequency band is lower than the second frequency band, the frequency selection circuit 161 may be, for example, a low-pass filter circuit whose pass band is the first frequency band and whose attenuation band is the second frequency band, and the frequency selection circuit 162 may be a high-pass filter circuit whose attenuation band is the first frequency band and whose pass band is the second frequency band. Radio-frequency signals in the first frequency band that are transmitted through the feed line 151 and the frequency selection circuit 161 (the low-pass filter circuit) and are substantially in antiphase to each other are respectively fed to the feed points 111 and 112. Radio-frequency signals in the second frequency band that are transmitted through the feed line 152 and the frequency selection circuit 162 (the high-pass filter circuit) and are substantially in phase with each other are respectively fed to the feed points 111 and 112.

Radio-frequency signals lying in the first frequency band and directed to the feeding conductor pattern 11 are kept, to the extent possible, from flowing into the feed line 152 by the frequency selection circuit 162. The frequency selection circuit 161 causes these signals to flow through the feed line 151. Radio-frequency signals in the second frequency band are kept, to the extent possible, from flowing into the feed line 151 by the frequency selection circuit 161. The frequency selection circuit 162 causes these signals to flow through the feed line 152. Consequently, radio-frequency signals lying in the first frequency band and being in antiphase to each other are respectively fed to the feed points 111 and 112, and radio-frequency signals lying in the second frequency band and being in phase with each other are respectively fed to the feed points 111 and 112. This may lead to further enhanced frequency selectivity and higher directivity in the first frequency band.

When the first frequency band is higher than the second frequency band, the frequency selection circuit 161 may be, for example, a high-pass filter circuit whose pass band is the first frequency band and whose attenuation band is the second frequency band, and the frequency selection circuit 162 may be a low-pass filter circuit whose attenuation band is the first frequency band and whose pass band is the second frequency band. Radio-frequency signals in the first frequency band that are transmitted through the feed line 151 and the frequency selection circuit 161 (the high-pass filter circuit) and are substantially in antiphase to each other are respectively fed to the feed points 111 and 112. Radio-frequency signals in the second frequency band that are transmitted through the feed line 152 and the frequency selection circuit 162 (the low-pass filter circuit) and are substantially in phase with each other are respectively fed to the feed points 111 and 112.

Radio-frequency signals lying in the first frequency band and directed to the feeding conductor pattern 11 are kept, to the extent possible, from flowing into the feed line 152 by the frequency selection circuit 162. The frequency selection circuit 161 causes these signals to flow through the feed line 151. Radio-frequency signals in the second frequency band are kept, to the extent possible, from flowing into the feed line 151 by the frequency selection circuit 161. The frequency selection circuit 162 causes these signals to flow through the feed line 152. Consequently, radio-frequency signals lying in the first frequency band and being in antiphase to each other are respectively fed to the feed points 111 and 112, and radio-frequency signals lying in the second frequency band and being in phase with each other are respectively fed to the feed points 111 and 112. This may lead to further enhanced frequency selectivity and higher directivity in the first frequency band.

The frequency selection circuit 161 or 162 may be omitted. In this case, radio-frequency signals lying in the first frequency band and being substantially in antiphase to each other may be respectively fed to the feed points 111 and 112, and radio-frequency signals lying in the second frequency band and being substantially in phase with each other may be respectively fed to the feed points 111 and 112. The patch antenna may be compact and have enhanced frequency selectivity and high directivity.

[1.3 Configuration of Patch Antenna According to Modification]

Figure 7A:
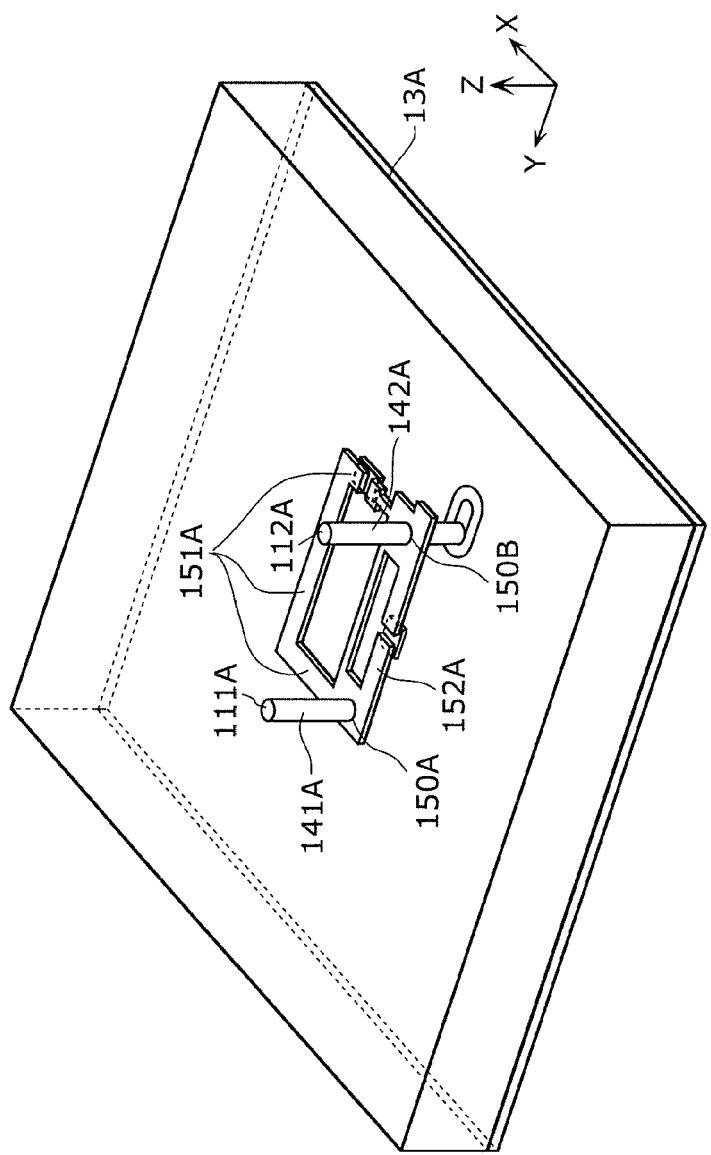
FIG. 7A is a perspective view of the patch antenna according to the modification of the embodiment, illustrating principal part thereof except for a feeding conductor pattern, a second ground conductor pattern, and a dielectric substrate.

FIGS. 6A and 6B include a plan view and a sectional view, respectively, of an antenna module 1A according to a modification of the embodiment. FIG. 7A is a perspective view of a patch antenna 10A according to the embodiment, illustrating principal part thereof except for a feeding conductor pattern 11A, a ground conductor pattern 12A, and the dielectric substrate 20. FIG. 7B is a perspective view of principal part of the patch antenna 10A according to the modification of the embodiment, illustrating an example feeding configuration of the patch antenna 10A. FIG. 6B is a sectional view of the antenna module 1A taken along line VI-VI in FIG. 6A.

The patch antenna 10A includes the dielectric substrate 20, the ground conductor pattern 12A, a ground conductor pattern 13A, and the feeding conductor pattern 11A. As illustrated in FIGS. 6A, 6B, 7A, and 7B, the patch antenna 10A also includes feed lines 151A and 152A and frequency selection circuits 161A and 162A. An external perspective view of the patch antenna 10A according to the present modification may be obtained by respectively substituting the feeding conductor pattern 11A, the ground conductor pattern 12A, and the ground conductor pattern 13A for the feeding conductor pattern 11, the ground conductor pattern 12, and the ground conductor pattern 13 of the patch antenna 10 in FIG. 2 and is omitted from the drawings.

As illustrated in FIG. 6B, the antenna module 1A includes the patch antenna 10A and the RFIC 3. The RFIC 3 is a feeder circuit that feeds radio-frequency signals to the feeding conductor pattern 11A. The RFIC 3 may be disposed on a main surface of the dielectric substrate 20 opposite to another main surface on which the feeding conductor pattern 11A is provided.

The ground conductor pattern 13A is a first ground conductor lying in a plane and provided on a main surface on the back side (in the z-axis negative direction) of the dielectric substrate 20 in a manner so as to be substantially parallel to another main surface of the dielectric substrate 20 as illustrated in FIGS. 6A, 6B, and 7A. The ground conductor pattern 13A is set to ground potential.

The feeding conductor pattern 11A is a feeding conductor lying in a plane and is disposed on the dielectric substrate 20 in a manner so as to face (be substantially parallel to) the ground conductor pattern 13A. The feeding conductor pattern 11A has a feed point 111A (a first feed point) and a feed point 112A (a second feed point), which are opposite to each other with respect to the center point of the feeding conductor pattern 11A when the feeding conductor pattern 11A is viewed in plan (in the direction from the Z-axis positive side to the Z-axis negative side). As illustrated in FIGS. 6A, 6B, and 7A, the feed points 111A and 112A are points on the feeding conductor pattern 11A that are connected directly to feeding via conductors 141A and 142A, respectively. It is only required that the feed points 111A and 112A be opposite to each other with respect to the center point. To ensure radiation of radio waves with enhanced directivity, the feed points 111A and 112A can be arranged symmetrically about the center point in the Y-axis direction as illustrated in FIG. 6A. The feed points 111A and 112A may be fed capacitively through the feeding via conductors 141A and 142A, respectively. In this case, the feed points 111A and 112A may be respectively connected to the feeding via conductors 141A and 142A through corresponding capacitive coupling portions instead of being respectively connected directly to the feeding via conductors 141A and 142A.

The ground conductor pattern 12A is a second ground conductor lying in a plane and provided between the ground conductor pattern 13A and the feeding conductor pattern 11A in a manner so as to be substantially parallel to the main surfaces of the dielectric substrate 20 as illustrated in FIGS. 6A and 6B. The ground conductor pattern 12A is set to ground potential. As illustrated FIG. 6A, the ground conductor pattern 12 has cavities 121A and 122A. The feeding via conductors 141A and 142A extend through the cavities 121A and 122A, respectively.

The ground conductor pattern 12A may be optionally included in the patch antenna 10A according to the present modification. The ground conductor pattern 12A provides added shielding to the feed lines 151A and 152A and to the feeding via conductors 141A and 142A, thus enabling radiation or reception of radio-frequency signals with a lower level of noise.

As illustrated in FIGS. 6A, 6B, and 7A, the feed lines 151A and 152A are provided in a layer sandwiched between the ground conductor pattern 13A and the feeding conductor pattern 11A (and between the ground conductor pattern 13A and the ground conductor pattern 12A). The feed line 151A is a first feed line disposed between the feed branch points 150A and 150B. The feed line 152A is a second feed line disposed between the feed branch points 150A and 150B. The feed lines 151A and 152A are lines branching from the branch points of a common feed line. The common feed line (not illustrated) is, for example, a line connecting the RFIC 3 to the feed branch point 150B.

As illustrated in FIG. 7B, the frequency selection circuit 161A is disposed on the feed line 151A. In the present modification, the frequency selection circuit 161A is formed by using part of the path of the feed line 151A. As illustrated in FIG. 5, the feed line 151A and the frequency selection circuit 161A, which constitute circuitry, are connected in series between the feed branch points 150A and 150B. The frequency selection circuit 161A is, for example, an "LC series resonant circuit" in which an inductor 151L and a capacitor 151C are connected in series as illustrated in FIG. 7B. The inductor 151L is provided in a portion whose line width is smaller than the line width of the other portion of the feed line 151A. The capacitor 151C includes a discontinuity in the feed line 151A and an electrode disposed in a layer facing the layer in which the feed line 151A is provided. The electrode is disposed in a manner so as to cover the discontinuity. The frequency selection circuit 161A configured as described above serves as, for example, a band pass filter (BPF).

As illustrated in FIG. 7B, the frequency selection circuit 162A is disposed on the feed line 152A. In the present modification, the frequency selection circuit 162A is formed by using part of a path of the feed line 152A. As illustrated in FIG. 5, the feed line 152A and the frequency selection circuit 162A, which constitute circuitry, are connected in series between the feed branch points 150A and 150B. The frequency selection circuit 162A is, for example, an "LC parallel resonant circuit" in which an inductor 152L and a capacitor 152C are connected in parallel as illustrated in FIG. 7B. The inductor 152L is provided in a portion whose line width is smaller than the line width of the other portion of the feed line 152A. The capacitor 152C includes a discontinuity in the feed line 152A and an electrode disposed in a layer facing the layer in which the feed line 152A is provided. The electrode is disposed in a manner so as to cover the discontinuity. The frequency selection circuit 162A configured as described above serves as, for example, a band elimination filter (BEF).

The feed branch point 150A is connected to the feed point 111A through the feeding via conductor 141A, and the feed branch point 150B is connected to the feed point 112A through the feeding via conductor 142A.

Each of the frequency selection circuits 161A and 162A is a circuit configured to allow passage of radio-frequency signals in one frequency band and to attenuate radio-frequency signals in another frequency band.

The aforementioned configuration in the present modification offers the following advantages. Radio-frequency signals lying in the first frequency band and being substantially in antiphase to each other may be respectively fed to the feed points 111A and 112A through the feed line 151A by the frequency selection circuit 161A. Radio-frequency signals lying in the second frequency band and being substantially in phase with each other may be respectively fed to the feed points 111A and 112A through the feed line 152A by the frequency selection circuit 162A. Consequently, the directivity of first-frequency-band radio waves may be enhanced, and radiation of second-frequency-band radio waves may be suppressed. This may lead to enhanced frequency selectivity and high directivity. The patch antenna 10A employs antiphase feeding through the feed line 151A and in-phase feeding through the feed line 152A to achieve enhanced frequency selectivity. Requirements pertaining to bandpass characteristics of radio-frequency signals and required of the frequency selection circuits 161A and 162A may thus be less stringent than requirements pertaining to bandpass characteristics of radio-frequency signals and required of filter circuitry included in a conventional antenna module in which the frequency selectivity for radiation of radio waves may be enhanced through the use of the filter circuitry alone. Specifically, requirements pertaining to bandpass characteristics such as steepness and insertion loss and required of the frequency selection circuits 161A and 162A may be less stringent than requirements pertaining to the bandpass characteristics and required of the filter circuitry of the conventional antenna module. The frequency selection circuits 161A and 162A may thus be compact, and hence the patch antenna 10A may be compact and have enhanced frequency selectivity and high directivity.

When the feeding conductor pattern 11A is viewed in plan, the feed lines 151A and 152A and the frequency selection circuits 161A and 162A of the patch antenna 10A according to the present modification are disposed within a region over which the feeding conductor pattern 11A extends as illustrated in FIG. 6A.

That is, when the feeding conductor pattern 11A is viewed in plan, neither the feed lines 151A and 152A nor the frequency selection circuits 161A and 162A are disposed outside the region over which the feeding conductor pattern 11A extends. The patch antenna 10A and the antenna module 1A may thus be compact.

Moreover, the patch antenna 10A according to the present modification is advantageous in that the feed lines 151A and 152A and the frequency selection circuits 161A and 162A may be provided in a region sandwiched between the ground conductor pattern 13A and the feeding conductor pattern 11A, with no increase in the area of the layer in which the ground conductor pattern 13A is provided and no increase in the area of the layer in which the feeding conductor pattern 11A is provided. The patch antenna 10A achieves area savings accordingly.

[1.4 Features of Patch Antenna]

The following describes feeding characteristics and radiation characteristics of the patch antenna 10 according to the present embodiment.

Figure 8A:
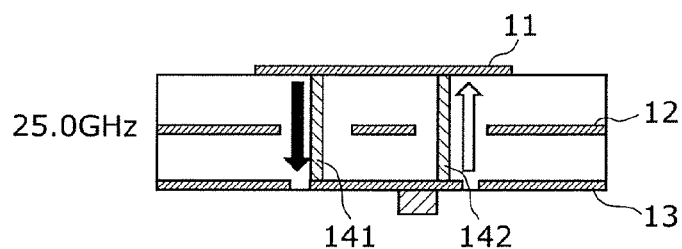
FIGS. 8AA, 8AB, and 8AC illustrate relative phases of radio-frequency signals in three frequency bands covered by a patch antenna according to a comparative example.
Figure 8A:
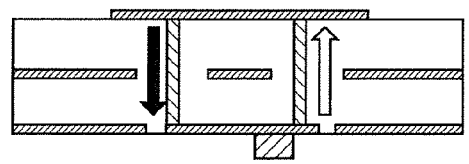
Figure 8A:
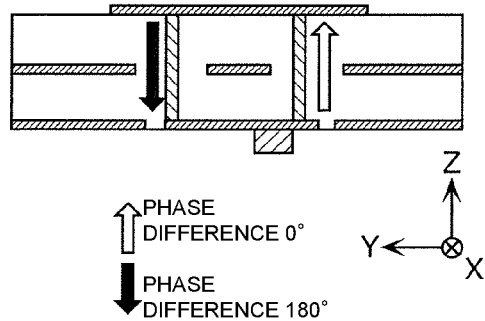
Figure 8B:
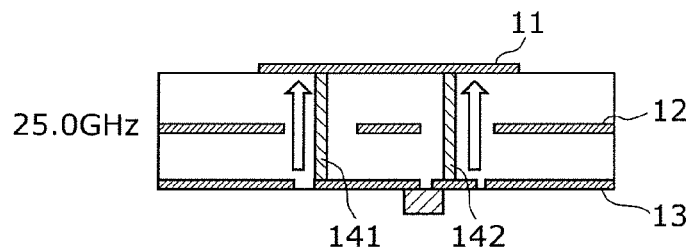
FIGS. 8BA, 8BB, and 8BC illustrate relative phases of radio-frequency signals in three frequency bands covered by the patch antenna according to the embodiment.
Figure 8B:
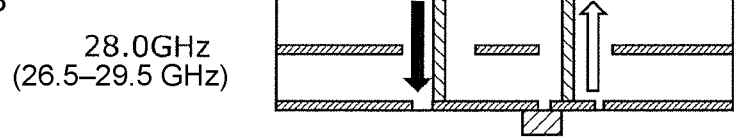
Figure 8B:
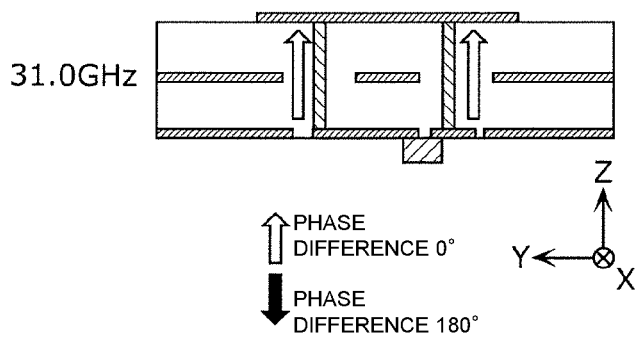

FIGS. 8AA, 8AB, and 8AC illustrate relative phases of radio-frequency signals in three frequency bands covered by a patch antenna according to a comparative example. FIGS. 8BA, 8BB, and 8BC illustrate relative phases of radio-frequency signals in three frequency bands covered by the patch antenna 10 according to the embodiment. FIGS. 8AA, 8AB, 8AC and 8BA, 8BB, 8BC illustrate results of simulations performed in such a manner as to apply radio-frequency signals in three different frequency bands to the common feed line. The phase distributions of radio-frequency signals flowing through the feed lines 151 and 152 and through the feeding via conductors 141 and 142 are illustrated integrally.

The configuration of the patch antenna according to the comparative example differs from the configuration of the patch antenna 10 according to the present embodiment in that neither the frequency selection circuits 161 and 162 nor the feed line 152 through which in-phase radio-frequency signals in the second frequency band are fed is provided.

As illustrated in FIGS. 8AA, 8AB, and 8AC, radio-frequency signals flow through the patch antenna according to the comparative example in the following manner: in each of the three frequency bands including FIG. 8AA a (second) frequency band whose center frequency is 25.0 GHz, FIG. 8AB a (first) frequency band (26.5 to 29.5 GHz) whose center frequency is 28.0 GHz, and FIG. 8AC a (second) frequency band whose center frequency is 31.0 GHz, the flow of signals through the feeding via conductor 142 connected to the feed point 112 includes mainly radio-frequency signals with a phase difference of 0°, and the flow of signals through the feeding via conductor 141 connected to the feed point 111 includes mainly radio-frequency signals with a phase difference of 180°. That is, the patch antenna according to the comparative example involves, in the three frequency bands, substantially antiphase feeding to the feed points 111 and 112.

As illustrated in FIGS. 8BA, 8BB, and 8BC, radio-frequency signals flow through the patch antenna 10 according to the embodiment in the following manner: in FIG. 8BA the (second) frequency band whose center frequency is 25.0 GHz and in FIG. 8BC the (second) frequency band whose center frequency is 31.0 GHz, the flow of signals through the feeding via conductor 141 includes mainly radio-frequency signals with a phase difference of 0°, and the flow of signals through the feeding via conductor 142 also includes mainly radio-frequency signals with a phase difference of 0°. In FIG. 8BB the (first) frequency band (26.5 to 29.5 GHz) whose center frequency is 28.0 GHz, the flow of signals through the feeding via conductor 141 includes mainly radio-frequency signals with a phase difference of 0°, and the flow of signals through the feeding via conductor 142 includes mainly radio-frequency signals with a phase difference of 180°. That is, the patch antenna 10 according to the embodiment involves substantially in-phase feeding to the feed points 111 and 112 in two of the three frequency bands (in the frequency band whose center frequency is 25.0

GHz and in the frequency band whose center frequency is 31.0 GHz) and involves substantially antiphase feeding to the feed points 111 and 112 in one of the three frequency bands (in the frequency band whose center frequency is 28.0 GHz).

Figure 9:
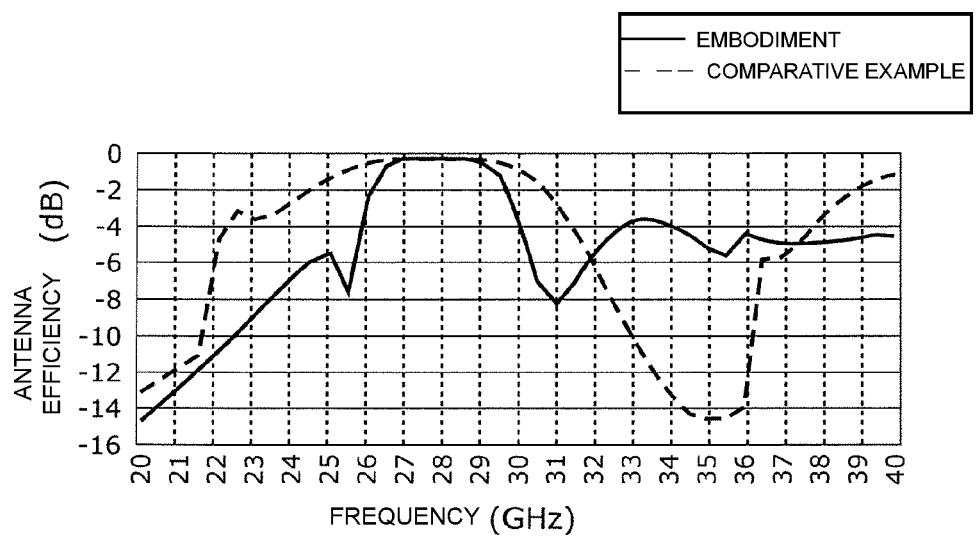
FIG. 9 is a graph that gives a comparison of frequency characteristics of the antenna efficiency achieved by the patch antenna according to the embodiment and frequency characteristics of the antenna efficiency achieved the patch antenna according to the comparative example.

FIG. 9 is a graph that gives a comparison of frequency characteristics of the antenna efficiency achieved by the patch antenna according to the embodiment and frequency characteristics of the antenna efficiency achieved by the patch antenna according to the comparative example.

As illustrated in the drawing, the patch antenna according to the comparative example involves substantially antiphase feeding to two feed points, namely, the feed points 111 and 112 in the three frequency bands (whose center frequencies are 25.0 GHz, 28.0 GHz, 31.0 GHz, respectively), and as a result, radio waves in a wide frequency range including the three frequency bands are radiated from the feeding conductor pattern with high degrees of antenna efficiency.

Meanwhile, the patch antenna 10 according to the present embodiment involves substantially antiphase feeding to the feed points 111 and 112 in one frequency band (whose center frequency is 28.0 GHz), where radio waves are radiated from the feeding conductor pattern 11 with high degrees of antenna efficiency. The patch antenna 10 involves substantially in-phase feeding to the feed points 111 and 112 in two frequency bands (whose center frequencies are 25.0 GHz and 31.0 GHz, respectively), where radiation from the feeding conductor pattern 11 is suppressed.

The comparison about the feeding characteristics and the radiation characteristics indicates that the degree of frequency selectivity of the patch antenna 10 according to the present embodiment is higher than the degree of frequency selectivity of the patch antenna according to the comparative example. It may be required that radio-frequency signals in one of a plurality of frequency bands be radiated, with radiation of radio-frequency signals in adjacent frequency bands being suppressed. In such a case, the patch antenna 10 according to the present embodiment is more advantageous than the patch antenna according to the comparative example.

As in the case with the patch antenna 10 according to the embodiment, the degree of frequency selectivity of the patch antenna 10A according to the modification is higher than the degree of frequency selectivity of the patch antenna according to the comparative example.

Other Embodiments

The antenna element, the antenna module, and the communication device according to the present disclosure are not limited to those described so far in the embodiment and the modification thereof. The present disclosure embraces other embodiments implemented by varying combinations of constituent components of the embodiment above and the modification thereof, other modifications achieved through various alterations to the embodiment and modification above that may be conceived by those skilled in the art within a range not departing from the spirit of the present disclosure, and various types of apparatuses including the antenna element, the antenna module, and the communication device according to the present disclosure.

The feed point of the feeding conductor pattern in the present embodiment or the modification thereof is a position (point) on the feeding conductor pattern where the feed line extends upward from the ground conductor pattern side to a layer including the feeding conductor pattern. When the feeding conductor pattern has a cavity through which the feed line extends with a clearance therebetween, the feed point may refer to a region that is part of the feeding conductor pattern and is closer than any other region of the feeding conductor pattern to the position mentioned above.

The patch antennas according to the embodiment and the modification thereof are also applicable to Massive MIMO systems. One of up-and-coming radio transmission techniques for the fifth-generation mobile communication system (5G) is a combination of Phantom Cell and a Massive MIMO system. Phantom Cell refers to a network architecture involving separation between a data signal that is to be transmitted by high-speed data communications and a control signal that is to be transmitted to attain stability of communication between a macro cell using a lower frequency band and a small cell using a higher frequency band. The individual cells constituting the Phantom Cell are provided with their respective Massive MIMO antenna devices. Such a Massive MIMO system is a technique for improving transmission quality in, for example, millimeter-wave bands, where the directivity of patch antennas is controlled through control of signals transmitted from the individual patch antennas. A large number of patch antennas are included in the Massive MIMO system, which in turn enables formation of sharply directional beams. Forming highly directional beams is advantageous in that radio waves in high frequency bands may be transmitted over a somewhat long distance and that inter-cell interference may be reduced to achieve a high degree of frequency utilization efficiency.

Although the patch antennas described in the embodiment and the modification thereof include their respective dielectric substrates, the patch antenna according to the present disclosure may be made of sheet metal instead of including a dielectric substrate. An antenna device may include a plurality of patch antennas, each of which is configured as described above. The patch antennas may be provided on or in the same dielectric substrate. Furthermore, the patch antennas may be provided on or in the same substrate. Alternatively, one or more of the patch antennas may be provided on or in another member such as a housing instead of being provided on or in the dielectric substrate.

INDUSTRIAL APPLICABILITY

The present disclosure may be widely used as an antenna element that has multi-band features and may be included in a communication apparatus geared to a system such as a millimeter-wave band mobile communication system or a Massive MIMO system.

REFERENCE SIGNS LIST

1, 1A antenna module
2 baseband signal processing circuit (BBIC)
3 RF signal processing circuit (RFIC)
4 array antenna
5 communication device
10, 10A patch antenna
11, 11A feeding conductor pattern
12, 12A, 13, 13A ground conductor pattern
20 dielectric substrate
31A, 31B, 31C, 31D, 33A, 33B, 33C, 33D, 37 switch
32AR, 32BR, 32CR, 32DR low-noise amplifier
32AT, 32BT, 32CT, 32DT power amplifier
34A, 34B, 34C, 34D attenuator
35A, 35B, 35C, 35D phase shifter
36 signal combiner/splitter 38 mixer
39 amplifier circuit
111, 111A, 112, 112A feed point
121, 121A, 122, 122A, 131 cavity
141, 141A, 142, 142A feeding via conductor
150A, 150B feed branch point
151, 151A, 152, 152A feed line
151C, 152C capacitor
151L, 152L inductor
161, 161A, 162, 162A frequency selection circuit

The invention claimed is:

1. An antenna element comprising:
a ground conductor having a ground potential, the ground conductor being in a first plane of the antenna element;
a feeding conductor in a second plane of the antenna element that faces the ground conductor, the feeding conductor comprising a first feed point and a second feed point and being configured to be fed with radio-frequency signals through the first and second feed points, wherein as seen in a plan view, the first and second feed points are opposite each other with respect to a center of the feeding conductor;
a first feed line and a second feed line that are connected in parallel between the first and second feed points, the first and second feed lines having different lengths; and
a frequency selection circuit in a path of the first feed line or a path of the second feed line, the frequency selection circuit being configured to pass radio-frequency signals in one frequency band and to attenuate radio-frequency signals in another frequency band,
wherein the first feed line is configured to feed radio-frequency signals that are in a first frequency band and that are substantially antiphase to each other, and
wherein the second feed line is configured to feed radio-frequency signals that are in a second frequency band and that are substantially in phase with each other.

2. The antenna element according to claim 1, wherein:
the length of the first feed line is equal to $(n+1/2)\lambda 1\,g$, where n is any integer and $\lambda 1\,g$ is a wavelength of a radio-frequency signal in the first frequency band transmitted through the first feed line, and
the length of the second feed line is equal to $n\lambda 2\,g$, where n is any integer and $\lambda 2\,g$ is a wavelength of a radio-frequency signal in the second frequency band transmitted through the second feed line.

3. The antenna element according to claim 1, wherein:
the first and second feed lines are branched from a branch point of a common feed line, and
as seen in the plan view, the first feed line, the second feed line, and the frequency selection circuit are in a region over which the feeding conductor pattern extends.

4. The antenna element according to claim 1, wherein the frequency selection circuit is an LC circuit comprising an inductor and a capacitor.

5. The antenna element according to claim 4, wherein:
the inductor is a portion of the first feed line or the second feed line, a line width of the portion being less than a line width of another portion of the first feed line or the second feed line, and
the capacitor comprises a discontinuity in the first feed line or the second feed line.

6. The antenna element according to claim 4, wherein:
the first and second feed lines are in a third layer of the antenna element between the ground conductor and the feeding conductor, and
the capacitor comprises an electrode in a fourth layer that faces the second layer, the electrode covering a discontinuity in the first feed line or the second feed line.

7. The antenna element according to claim 4, further comprising a dielectric substrate, the ground conductor and the feeding conductor being on the dielectric substrate, wherein:
the first feed line, the second feed line, and the ground conductor are in the same layer, and
the inductor or the capacitor is a chip component mounted on a first main surface of the dielectric substrate, the first main surface being closer to the ground conductor than a second main surface of the dielectric substrate that is opposite the first main surface.

8. The antenna element according to claim 1, wherein:
the frequency selection circuit comprises:
a band-pass filter circuit in the first feed line, a pass band of the band-pass filter circuit being the first frequency band; and
a band-elimination filter circuit in the second feed line, an attenuation band of the band-elimination filter circuit being the first frequency band,
radio-frequency signals in the first frequency band that are transmitted through the first feed line and the band-pass filter circuit and that are substantially in antiphase to each other, are respectively fed to the first and second feed points,
radio-frequency signals in the second frequency band that are transmitted through the second feed line and the band-elimination filter circuit and that are substantially in phase with each other, are respectively fed to the first and second feed points, and
the first and second frequency bands are different frequency bands.

9. The antenna element according to claim 1, wherein:
the first frequency band is lower than the second frequency band,
the frequency selection circuit comprises:
a low-pass filter circuit in the first feed line, a pass band of the low-pass filter circuit being the first frequency band, and an attenuation band of the low-pass filter circuit being the second frequency band; and
a high-pass filter circuit in the second feed line, an attenuation band of the high-pass filter circuit being the first frequency band, and a pass band of the high-pass filter circuit being the second frequency band,
radio-frequency signals in the first frequency band that are transmitted through the first feed line and the low-pass filter circuit and that are substantially in antiphase to each other, are respectively fed to the first and second feed points, and
radio-frequency signals in the second frequency band that are transmitted through the second feed line and the high-pass filter circuit and that are substantially in phase with each other, are respectively fed to the first and second feed points.

10. The antenna element according to claim 1, wherein:
the first frequency band is higher than the second frequency band,
the frequency selection circuit comprises:
a high-pass filter circuit in the first feed line, a pass band of the high-pass filter circuit being the first frequency band, and an attenuation band of the high-pass filter circuit being the second frequency band; and a low-pass filter circuit in the second feed line, an attenuation band of the low-pass filter circuit being the first frequency band, and a pass band of the low-pass filter circuit being the second frequency band, radio-frequency signals in the first frequency band that are transmitted through the first feed line and the high-pass filter circuit and that are substantially in antiphase to each other, are respectively fed to the first and second feed points, and radio-frequency signals in the second frequency band that are transmitted through the second feed line and the low-pass filter circuit and that are substantially in phase with each other, are respectively fed to the first and second feed points.

11. An antenna system comprising:
a substrate; and
a plurality of the antenna elements according to claim 1, arranged in a one-dimensional or two-dimensional arrangement,
wherein the plurality of antenna elements are on or in the substrate.

12. An antenna module comprising:
the antenna element according to claim 1; and
a feeder circuit configured to feed radio-frequency signals to the feeding conductor, wherein:
the feeding conductor is on a first main surface of a dielectric substrate,
the ground conductor is on a second main surface of the dielectric substrate, the second main surface being opposite to the first main surface, and
the feeder circuit is on the second main surface of the dielectric substrate.

13. A communication device comprising:
the antenna element according to claim 1; and
a radio-frequency (RF) signal processing circuit configured to feed a radio-frequency signal to the feeding conductor,
wherein the RF signal processing circuit comprises:
a phase-shift circuit configured to shift a phase of the radio-frequency signal, and
an amplifier circuit configured to amplify the radio-frequency signal.

* * * * *